United States Patent [19]

Nakamura et al.

[11] Patent Number: 4,863,795
[45] Date of Patent: Sep. 5, 1989

[54] MAGNETIC RECORDING MEDIUM

[75] Inventors: Itsuro Nakamura; Yoshiaki Sato; Junichi Ito, all of Yokohama, Japan

[73] Assignee: Victor Company of Japan, Yokohama, Japan

[21] Appl. No.: 99,067

[22] Filed: Sep. 21, 1987

[30] Foreign Application Priority Data

Sep. 22, 1986 [JP] Japan ................................ 61-224293

[51] Int. Cl.$^4$ .............................................. G11B 5/64
[52] U.S. Cl. .................................. 428/329; 252/62.56; 427/128; 428/694; 428/900
[58] Field of Search ............... 428/694, 900, 323, 329, 428/403; 252/62.56; 427/128

[56] References Cited

U.S. PATENT DOCUMENTS

| | | | |
|---|---|---|---|
| 4,420,537 | 12/1983 | Hayama et al. | 252/62.56 |
| 4,423,114 | 12/1983 | Saguchi et al. | 428/694 |
| 4,444,835 | 4/1984 | Togawa et al. | 428/694 |
| 4,515,857 | 5/1985 | Kitamoto et al. | 428/694 |
| 4,613,545 | 9/1986 | Chubachi et al. | 428/694 |
| 4,657,816 | 4/1987 | Siddiq | 428/694 |

Primary Examiner—Paul J. Thibodeau
Attorney, Agent, or Firm—Michael N. Meller

[57] ABSTRACT

A magnetic recording medium comprises a base film and a magnetic film having magnetic particles, formed on the base film. The magnetic film has a coercive force ranging from 750 Oe to 980 Oe and a residual magnetic flux density of 1,250 Gauss or over. In addition, the magnetic particles have a length of 0.2 μm or below.

3 Claims, 5 Drawing Sheets

FIG.1

| CHARACTERISTICS / MAGNETIC TAPES | CARRIER OUTPUT C(dB) | CARRIER OUTPUT-TO-NOISE RATIO (dB) | OPTIMUM RECORDING CURRENT (dB) | EDGE NOISE - STANDARD MODE | EDGE NOISE - HIGH PICTURE QUALITY MODE | OVER MODULATION - STANDARD MODE | OVER MODULATION - HIGH PICTURE QUALITY MODE | TOTAL PICTURE QUALITY - STANDARD MODE | TOTAL PICTURE QUALITY - HIGH PICTURE QUALITY MODE |
|---|---|---|---|---|---|---|---|---|---|
| A | +1.6 | +1.9 | +0.7 | ○ | × | ○ | × | ○ | × |
| B | +1.0 | +1.2 | +1.7 | × | × | × | × | × | △ |
| C | +2.5 | +2.3 | +1.7 | × | ○ | ○ | ○ | × | ○ |
| D | +1.7 | +2.1 | +1.5 | ○ | ○ | ○ | ○ | ○ | ○ |
| E | +3.0 | +3.2 | +1.6 | ◎ | ○ | ◎ | ○ | ◎ | ◎ |

×: NON-TOLERABLE
△: TOLERBLE LIMIT
○: TOLERABLE
◎: EXCELLENT

FIG.5

| CHARACTER-ISTICS | MAGNETIC PROPERTIES | | | AUDIO CHARACTERISTIC | VIDEO CHARACTERISTICS | | | REPRODUCED PICTURE QUALITY | REPRODUCED AUDIO QUALITY | OVERALL VALUATION |
|---|---|---|---|---|---|---|---|---|---|---|
| MAGNETIC TAPES | COERCIVE FORCE Hc(Oe) | RESIDUAL MAGNETIC FLUX DENSITY Br(G) | MAGNETIC PARTICLE LENGTH ℓ(μm) | ERASED RATIO (dB) | CARRIER OUTPUT C(dB) | CARRIER OUTPUT-TO-NOISE RATIO C/N(dB) | OPTIMUM RECORDING CURRENT (dB) | | | |
| A | 710 | 1140 | 0.19 | 70 | 0 | 0 | 0 | × | ○ | × |
| B | 945 | 1180 | 0.18 | 66 | +1.5 | +1.6 | +1.5 | × | ○ | × |
| C | 780 | 1350 | 0.15 | 68 | +1.8 | +2.4 | +0.5 | ○ | ○ | ○ |
| D | 980 | 1350 | 0.20 | 65 | +2.1 | +2.0 | +1.6 | ○ | ○ | ○ |
| E | 760 | 1700 | 0.15 | 69 | +1.7 | +2.1 | +0.3 | ○ | ○ | ○ |
| F | 730 | 1700 | 0.15 | 69 | +1.5 | +1.8 | +0.5 | × | ○ | × |
| G | 980 | 1280 | 0.23 | 65 | +1.7 | +1.6 | +1.6 | × | ○ | × |
| H | 1000 | 1700 | 0.15 | 65 | +3.3 | +3.4 | +1.8 | × | × | × |
| I | 1500 | 2700 | 0.19 | 35 | — | — | — | × | × | × |

○ : GOOD
× : POOR

MAGNETIC RECORDING MEDIUM

BACKGROUND OF THE INVENTION

The present invention generally relates to magnetic recording mediums such as magnetic tapes, and in particular to a magnetic recording medium for realizing satisfactory magnetic recording and reproduction in not only a standard mode but also a high picture quality mode which has a carrier frequency higher than that in the standard mode.

Presently, performances of a magnetic tape and a magnetic head are considerably improved, and correspondingly there is desired a magnetic recording and reproducing apparatus of a high picture quality with resolution higher than that of video tape recorders which are widely used. For this reason, use of a high performance magnetic tape such as a metal tape is considered in place of standard magnetic tapes for use in the video tape recorders for home use. Such a high performance magnetic tape has a residual magnetic flux density (Br) and a coercive force (Hc) higher than those of the standard magnetic tapes. An information signal is recorded on the high performance magnetic tape by use of a carrier frequency (5 MHz–7 MHz, for example) which is considerably higher than that of the standard carrier frequency (3.4 MHz–4.4 MHz, for example).

In the present specification, a recording and reproducing mode presently which is widely employed in the vido tape recorders for home use is referred to as a standard mode, whereas a recording and reproducing mode in which the carrier frequency is made higher than that of that standard mode so as to realize a high picture quality is referred to as a high quality mode. As well known, there is no interchangeability between the standard mode and the high picture quality mode. However, it is possible to carry out recording and reproduction selectively in the standard and high picture quality modes in a video tape recorder. Such a video tape recorder is designed so that there is provided two kinds of signal processing circuits corresponding to the standard and high picture quality modes and a switching means for selecting either one of the signal processing circuits.

Now let us consider a magnetic tape which is accommodated in the video tape recorder which can record and reproduce the information signal thereon and therefrom in both the standard and high picture quality modes. It is well known that there are many kinds of magnetic tapes having distinct specifications currently available in the market. In general, these magnetic tapes can be classified into two kinds of magnetic tapes, one of which is a high picture quality magnetic tape such as a so-called metal tape and the like, and the other is a standard magnetic tape using iron oxide magnetic material as a magnetic material coated on a base film.

The video tape recorder having both the standard and high picture quality modes is now considered in which recording and reproduction are carried out in the case where a high picture quality magnetic tape is loaded therein. There are some problems in the optimum recording current or recording characteristics at short wave length and therefore reproduction of the video signal is not so good. And, when the video tape recorder is in the standard mode, a long wavelength recording characteristic relating to the recording and reproduction of an audio signal is noticeably degraded. For this reason, it is impossible to use the high picture quality magnetic tape in the standard mode.

In addition, it is considered that the recording and reproduction are carried out in a state where a standard magnetic tape is accommodated in the video tape recorder having both the standard and high picture quality modes. With the video tape recorder set in the high picture quality mode, the standard magnetic tape is not suited for the high picture quality mode from the point of view of its performance characteristics. Even when the recording based on the high picture quality mode is performed for the standard magnetic tape, a over modulation (the carrier signal which fails to be reproduced at the edge in reproduced picture brings about a reverse phenomenon between white and black) and/or an edge noise occurs (the noise observed near the bar edge in reproduced picture) on a reproduced picture. For this reason, it is impossible to use the standard tape in the high picture quality mode.

As will be anticipated from the above description, when trying to use the marketed magnetic tapes for the video tape recorder in which the standard and high picture quality modes are selectively switchable, it is necessary to select the magnetic tapes to suit the respective modes to be used. In other words, a magnetic tape which can be commonly used in each of the modes does not exist.

SUMMARY OF THE INVENTION

Accordingly, a general object of the present invention is to provide a novel and useful magnetic recording medium in which the above disadvantages have been eliminated.

A more specific object of the present invention is to provide a magnetic recording medium which can commonly be used in both the standard and high picture quality modes.

Another object of the present invention is to provide a magnetic recording medium which can provide excellent reproduced audio characteristics and excellent reproduced video characteristics.

Still another object of the present invention is to provide a magnetic recording medium which makes it possible to realize a high picture quality of a horizontal resolution of 400 scanning lines or over, and in addition to offer an improved picture quality even in the standard mode.

To attain the above objects and features, according to the present invention, there is provided a magnetic recording medium comprising a base film and a magnetic film having magnetic particles, formed on the base film. The magnetic film has a coercive force ranging from 750 Oe to 980 Oe and a residual magnetic flux density of 1,250 Gauss or over. In addition, the magnetic particles have a length of 0.2 $\mu$m or below. It is desirable that the lower limit of that length is 0.08 $\mu$m on the standpoint of producibillity or super-paramagnetism phenomenon.

Other objects and features of the present invention will become apparent from the following detailed description in conjunction with the attached drawings.

BRIEF DESCRIPTION OF THE DRAWINGS

FIG. 1 is a view showing the relationship between characteristics and qualities of many kinds of magnetic tapes;

FIG. 5 is a view showing several characteristics and valuations including the picture quality and audio quality at the time of reproduction.

DETAILED DESCRIPTION

Figure 2:
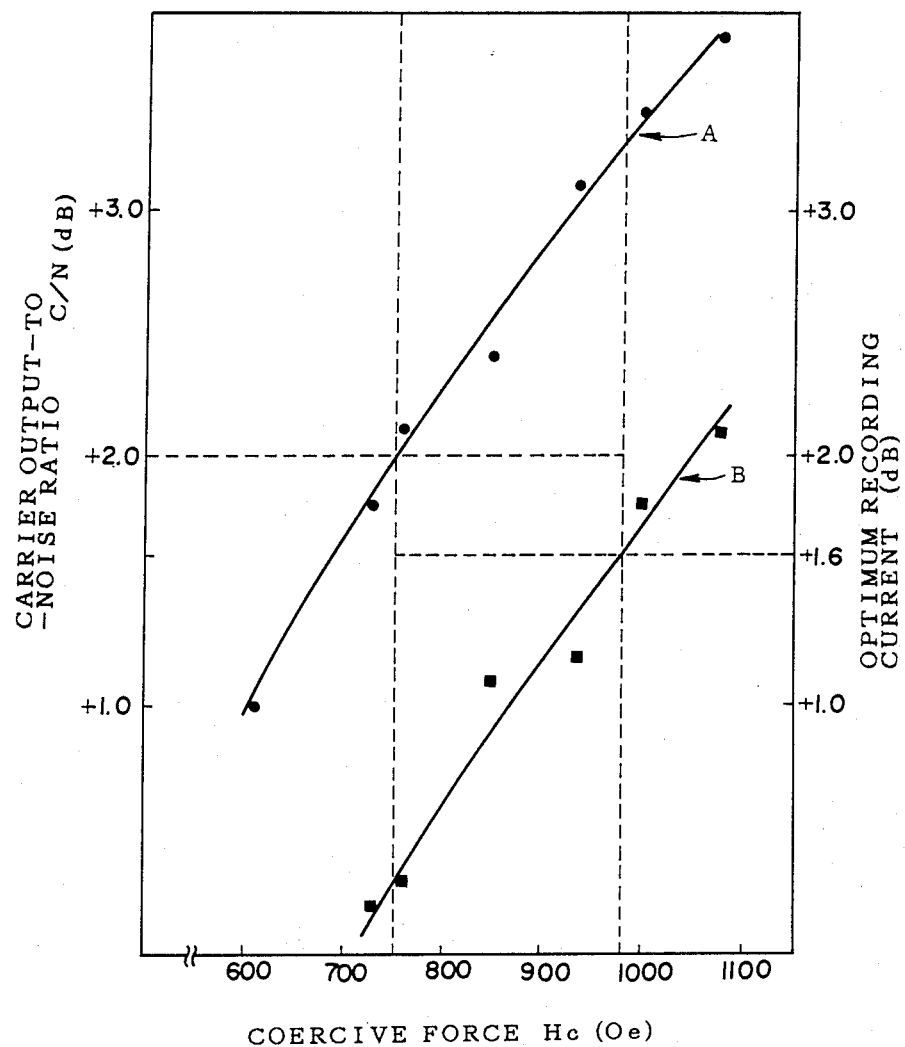
FIG. 2 is a graph showing the relationship between a carrier output-to-noise ratio and an optimum recording current with respect to the coercive force of a magnetic material coated on a base film of a magnetic tape.

In order to eliminate the above-mentioned problems of the conventional magnetic recording medium, a magnetic recording medium of the present invention is constituted so that the coercive force of a magnetic film is in the range of 750 Oe to 980 Oe, and the residual magnetic flux density thereof is 1,250 Gauss or over, and the magnetic particle length of magnetic particles forming the magnetic film is 0.2 μm or less.

Currently, the horizontal resolution in the standard video tape recorder for home use amounts to approximately 240 lines. However, the market requires a high performance video tape recorder having a horizontal resolution and a signal-to-noise ratio higher than those in the standard video tape recorder. In addition, it is desirable that a magnetic recording medium (hereafter referred to as a magnetic tape) which is designed to be suited for the high performance video tape recorder can be used for not only the high performance video tape recorder but also the standard video tape recorder. As a signal system which satisfies the above requirement, the following specifications are proposed.

| Luminance signal | FM recording | |
|---|---|---|
| | Frequency at white peak level | 7 MHz |
| | Frequency at clipping level | 9 MHz |
| | Frequency at synchronization signal level (sync. level) | 5 MHz |
| Chrominance signal | Low frequency range conversion chrominance signal recording system | PS (Phase shift) system |
| | Low frequency range conversion chrominance subcarrier frequency | 629 kHz |

The magnetic tape of the present invention can realize the horizontal resolution amounting to 400 lines or over when used in the video tape recorder having the above specification, and can provide satisfactory recording and reproducing characteristics when used in the standard video tape recorder.

A description will now be given on an example of a magnetic recording medium (a magnetic tape) constituted according to the present invention.

The present invention is substantially based upon the experiments which were effected by the present inventors. In the experiments, there were prepared a plurality of magnetic tapes each having distinct characteristics. With these magnetic tapes, two kinds of combinations of recording and reproduction were performed. One of these combinations is recording and reproduction based on the above specification (hereafter referred to as recording and reproducing in a high picture quality mode). The other is recording and reproduction based on the standard video tape recorder (hereafter referred to as recording and reproduction in the standard mode). The experiments used five kinds of magnetic tapes.

Characteristics and picture qualities of these magnetic tapes are shown in FIG. 1. In this figure, the characteristics of the magnetic tapes are recording and reproduction characteristics in the high picture quality mode. In detail, there are shown a carrier output, a carrier output-to-noise ratio (C/N) and an optimum recording current when the recording and reproduction were carried out at a frequency of 6 MHz. On the other hand, regarding the picture quality, an overall picture quality is shown which is obtained by overall judging an edge noise, a over modulation and the like. In FIG. 1, decibel (dB) which is a relative value is used as a unit for indicating the characteristics of the magnetic tapes. A reference for representing the characteristics of the magnetic tapes with decibel is the highest grade magnetic tape of the magnetic tapes which are presently available in the market. In the following description, the highest grade magnetic tape is referred to as a magnetic tape #1 for convenience. In addition, the present specification uses another relative value based on the standard magnet tape to explain the experimental results. When using said another relative value, a note will be specifically given in the specification. Therefore, when no specific note is given, the relative value represented with decibel is based on the magnetic tape #1. In the following description, the standard magnetic tape is referred to as a magnetic tape #2 for convenience. The experimental results shown in FIG. 1 were obtained under the following measurement conditions.

| | |
|---|---|
| Tape/head relative speed | 5.8 m/sec |
| Head gap width | 0.3 μm |
| Head track width | 58 μm |
| Noise resolution band range width | 10 kHz |
| Noise measurement frequency | A frequency 1 MHz lower than carrier frequency |

The following matters are understandable from FIG. 1. Firstly, when the carrier output C is 1.7 dB or below, the reproduced picture quality in the high picture quality mode is degraded. This is understandable from the magnetic tapes A and B. Secondly, when the carrier output-to-noise ratio (C/N) is 2.0 dB or below, the reproduced picture quality is degraded in the high picture quality mode. This is understandable from the magnetic tapes A and B. Thirdly, when the optimum recording current is 1.6 dB or over, the reproduced picture quality in the standard mode is degraded. This is understandable from the magnetic tape C. Fourthly, when the carrier output is 1.7 dB or over and in addition the carrier output-to-noise ratio (C/N) is 2.0 dB or over and further the optimum recording current is 1.6 dB or below, the reproduced picture quality is satisfactory in both the standard and high picture quality modes. This is understandable from the magnetic tapes D and E. That is, when the above fourth condition is satisfied, there is achievable the interchangeability between the standard and high picture quality modes at the recording frequency of 6 MHz. Other experiments were similarly carried out at each of the recording frequencies of 4.5 MHz and 8 MHz in order to investigate video characteristics required to provide the magnetic tape with the interchangeability between the standard and high picture quality modes. The experimental results are shown in TABLE I.

TABLE I

| Frequency f (MHz) | 4.5 | 6 | 8 |
|---|---|---|---|
| Wave length λ (μm) | 1.3 | 0.97 | 0.73 |
| Carrier output $\underline{C}$ (dB) | +6.3 or over (+1.7 or over) | +8.0 or over (+1.7 or over) | +9.3 or over (+1.7 or over) |
| Carrier output-to-noise ratio C/N (dB) | +8.3 or over (+2.0 or over) | +9.3 or over (+2.0 or over) | +9.8 or over (+2.0 or over) |
| Optimum recording current (dB) | +1.6 or less (+1.6 or less) | +1.6 or less (+1.6 or less) | +1.6 or less (+1.6 or less) |

In the TABLE I, numeral values in parentheses regarding the carrier output, carrier output-to-noise ratio and optimum recording current are relative values with respect to the magnetic tape #1, while numeral values without parenthese are based on the magnetic tape #2. As shown in TABLE I, relative values for each of the carrier output, carrier output-to-noise ratio and optimum recording current with respect to the magnetic tape #1 are identical to each other. Therefore, these values can easily be used as a reference upon valuation of the video characteristics.

A description will be given on magnetic characteristics of the magnetic tape which can present the video characteristics shown in TABLE I, in other words which is applicable to both the standard mode and the high picture quality mode.

Important matters to be considered when trying to obtain these magnetic characteristics are to satisfy the following conditions, while maintaining the interchangeability between the standard and high picture quality modes. The first requirement is that the optimum recording current of the magnetic tape for both the modes is not considerably different from that of the magnetic tape which satisfies the current standard. The second requirement is that it should be possible to reproduce the recorded signal of the maximum frequency of 9 MHz at a proper level. The third requirement is that the audio characteristics based on an alternating current bias recording are not considerably different from that obtained in the standard magnetic tape defined in the present standard.

A description will be given on the magnetic characteristics of the magnetic tape capable of realizing the interchangeability between the standard and high picture quality modes while referring to the experimental results.

The following parameters were commonly set in the experiments.

| | |
|---|---|
| Magnetic tape configuration | Magnetic particles coating type |
| Magnetic material | γ-hematite with Co adsorbed or added |
| Head material | Ferrite |
| Head gap width | 0.3 μm |
| Head track width | 58 μm |

[Experiment #1]
Dependency of carrier output-to-noise ratio C/N and optimum recording current with respect to coercive force Hc:

FIG. 2 shows the carrier output-to-noise ratio (denoted by an arrow A) and the optimum recording current (indicated by an arrow B) as a function of the coercive force of a magnetic material coated on a base film. Experimental parameters are listed below.

| | |
|---|---|
| Residual magnetic flux density (Br) | Constant in the vicinity of 1,700 Gauss |
| Coating thickness (tw) | 4.0 μm |
| Magnetic particles length (l) | 0.15 μm |

It can be understood from FIG. 2 that the carrier output-to-noise ratio and the optimum recording current increase with increasing the coercive force of the magnetic material coated on the base film. Now, referring to TABLE I shown previously, it can be understood from this table that when the carrier output-to-noise ratio C/N is b 2.0 dB or over and in addition the optimum recording current is 1.6 dB or less, it is possible to ensure the interchangeability between the standard and high picture quality modes. When applying this result to FIG. 2, the following condition relating to the coercive force Hc for realizing interchangeability can be introduced from the point of view of the carrier output-to-noise ratio and the optimum recording current. That is, the coercive force Hc for the carrier output-to-noise ratio C/N should be 750 Oe or over, whereas the coercive force Hc for the optimum recording current should be 980 Oe or less. That is, when 750 (Oe) < Hc < 980 (Oe) is satisfied, the interchangeability between the standard and high picture quality modes is obtainable.

Figure 3:
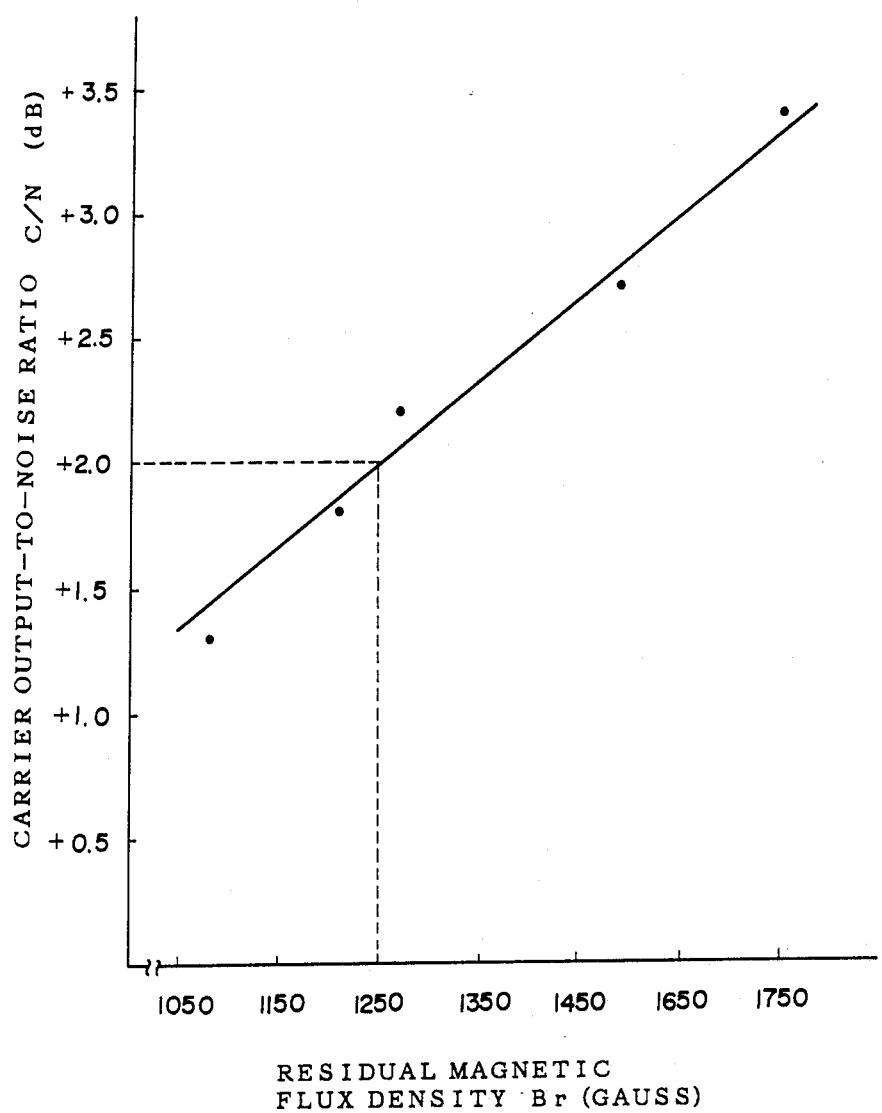
FIG. 3 is a graph showing the relationship between a carrier output-to-noise ratio with respect to the residual magnetic flux density of a magnetic material.

[Experiment #2]
Dependency of carrier output-to-noise ratio C/N with respect to residual magnetic flux density Br:

FIG. 3 shows the carrier output-to-noise ratio C/N as a function of the residual magnetic flux density Br of the magnetic materials. Experimental conditions were set as listed below.

| | |
|---|---|
| Coercive force (Hc) | Constant in the vicinity of 980 Oe |
| Coating thickness (tw) | 4.0 μm |
| Magnetic particle length (l) | 0.15 μm |

It can be understood from FIG. 3 that there is a substantially proportional relationship between the residual magnetic flux density Br and the carrier output-to-noise ratio C/N. A condition relating to the residual magnetic flux density for obtaining the interchangeability between the standard and high picture quality modes is now considered. As described previously by referring to TABLE I, in order that the carrier output-to-noise ratio C/N is 2.0 dB or over, the residual magnetic flux density Br must be 1,250 Gauss or over. That is, when the residual magnetic flux density is 1,250 Gauss or over, it is possible to provide both the modes with interchangeability.

Figure 4:
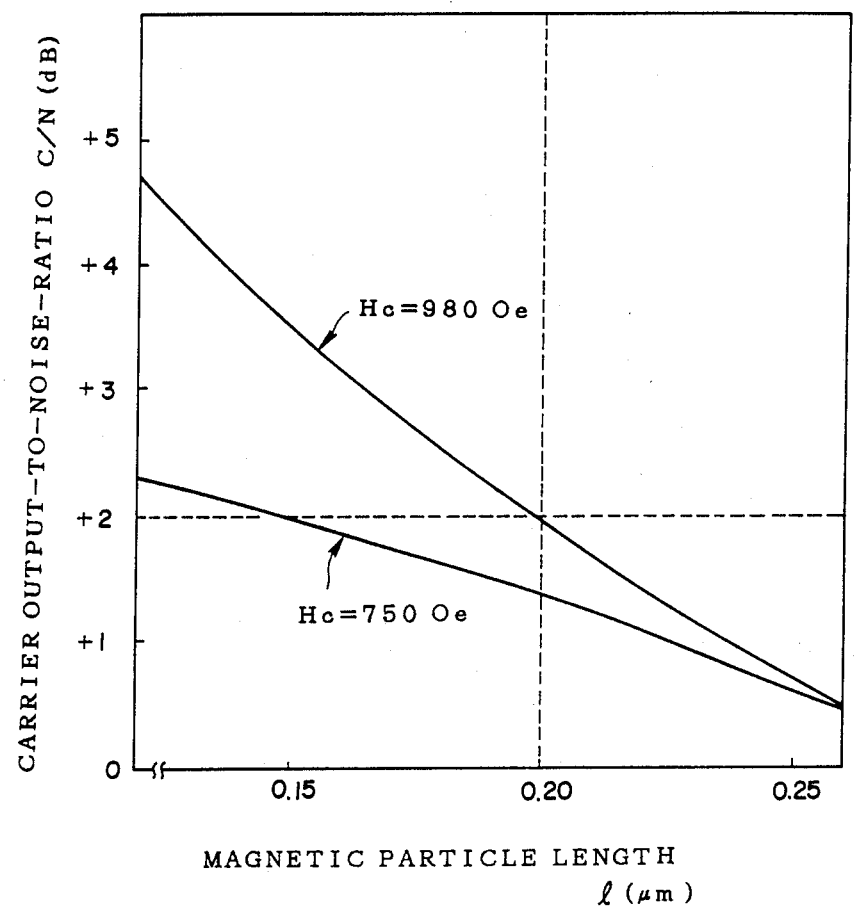
FIG. 4 is a graph showing a carrier output-to-noise ratio with respect to the length of magnetic particles.

[Experiment #3]
Dependency of carrier output-to-noise ratio C/N with respect to magnetic particle length l:

FIG. 4 shows the carrier output-to-noise ratio C/N as a function of the magnetic particle length. In the experiment #3, two kinds of magnetic tapes were prepared, one having the coercive force Hc of 980 Oe and the other having the coercive force of 750 Oe. The experimental condition employed is as follows.

Coating thickness (tw) 4.0 μm

It may be understood from FIG. 4 that the carrier output-to-noise ratio C/N of the magnetic tape is improved as the magnetic particle length l diminishes. As described previously with reference to TABLE I, it is required that the carrier output-to-noise ratio C/N is 2.0 dB or over. Therefore, when the magnetic particle length is 0.20 μm or below and the coercive force Hc ranges from 750 Oe to 980 Oe, the interchangeability between both the modes can be established.

Conclusions obtained from the experiments #1 to #3 described above are summarized in TABLE II shown below. That is, TABLE II represents the magnetic characteristics of the magnetic material which makes it possible to establish the interchangeability between the standard and high picture quality modes from the point of view of its video characteristics.

TABLE II

| Magnetic material | Co—γ—Fe$_2$O$_3$ |
|---|---|
| Coercive force Hc (Oe) | 750–980 |
| Residual magnetic flux density Br (Gauss) | 1,250 or over |
| Magnetic particle length l (μm) | 0.08–0.20 |

Next, a description will be given of the interchangeability between the standard and high picture quality modes from the point of view of the audio characteristics. As known, an audio signal system in the high picture quality mode has the same constitution as that in the standard mode. Therefore, the question whether the interchangeability therebetween can be established in terms of the audio characteristics depends on whether the recording and reproduction in the current standard mode are satisfactorily possible when using a magnetic tape having the magnetic properties shown in TABLE II. It should be note that the magnetic tape having the properties shown in TABLE II has the coercive force Hc and the residual magnetic flux density Br which are set to values higher than those for the magnetic tapes #1 and #2. For this reason, the validity relating to an audio erased ratio characteristic becomes questionable. This audio erased ratio characteristic is one of the audio characteristics such as a frequency characteristic, a signal-to-noise ratio (S/N) and the like. As well known, there is a possibility that a particular recorded audio would remain on the magnetic tape without being erased when the erased ratio in the audio system of the video tape recorder is not 65 dB nor over.

TABLE III shows the experimental results regarding the audio erased ratio characteristic for magnetic tapes which have parameters within the range of the magnetic properties shown in TABLE II or which have similar properties thereto. Measurement conditions in this experiment are listed below.

| Recording frequency | 1 kHz |
|---|---|
| Input level | +10 dB larger than standard level |
| Erasing current | A current value specified in standard mode |
| Tape speed | 33.3 mm/sec |

TABLE III

| | Hc (Oe) | Br (Gauss) | Erased ratio (dB) | Residual |
|---|---|---|---|---|
| Magnetic tape #1 | 1.500 | 2,700 | 35 | Yes |
| Magnetic tape #2 | 700 | 2,650 | 70 | No |
| Magnetic tape #3 | 980 | 1,300 | 68 | No |

TABLE III demonstrates that the interchangeability can be established from the point of view of the audio characteristics within the range of the magnetic properties shown in TABLE II relating to the video characteristics. As a result, the audio erased ratio is 65 dB or more. Consequently, the magnetic properties shown in TABLE II and the audio erased ratio of 65 dB or over are conditions for establishing the interchangeability between the standard and high picture quality mode.

After obtaining the above conditions for establishing the interchangeability between the standard and high picture quality modes, the present inventors prepared nine kinds of magnetic tapes each having distinct magnetic properties. Then, the video characteristics, audio characteristics, reproduced picture qualities and reproduced audio qualities for each of the prepared magnetic tapes were invenstigated. The results are shown in FIG. 5, in which the magnetic tapes are indicated by characters A to I, and the overall valuation based on the reproduced picture and audio characteristics is additionally shown for each magnetic tape. Further, a symbol 'O' indicates a good quality which means that both of the reproduced picture and audio modes are satisfactory in each of the standard and high picture quality modes, whereas symbol 'X' indicates a poor quality which means that at least one of the reproduced picture and audio modes is poor in either the standard mode or the high picture quality mode.

As will be apparent from FIG. 5, the overall valuation is good for the magnetic tapes which are within the range of the magnetic properties specified by TABLE II and have the audio erased ratio of 65 dB or over. That is, the magnetic tapes C, D and E can provide the interchangeability between the standard and high picture quality modes. However, the interchangeability is not obtainable with the magnetic tapes which do not satisfy the above conditions, or magnetic tapes A, B, F, G, H and I. As a result, the valuation of the present invention described in the foregoing has been proved, and the conditions for the interchangeability between the standard and high picture quality modes have been confirmed.

A description will be given on a magnetic tape which has the interchangeability between standard and high picture quality modes, or in other words satisfies the conditions for realizing the interchangeability between the the standard and high picture quality modes, and on a producing method therefor. Magnetic particles having the following parameters were used to produce the magnetic tape having the interchangeability.

[Magnetic particles]

| Material | Co adsorbed γ-hematite (Co—γ—Fe$_2$O$_3$) |
|---|---|
| Length | 0.12–0.19 (μm) |
| Axial ratio | 1:5–1:20 |
| Coercive force | 690–930 (Oe) |
| Number of Co atoms to number of Fe$^{2+}$ atoms (Co:Fe$^{+2}$) | 1:1.5–1:2.5 |

A magnetic paint was produced by adding to magnetic particles a dispersing agent and a binder solvent, and if necessary carbon black and alumina, and kneading and dispersing a mixture by means of a vibrating mill. As a binder used in the present invention, nitrocellulose, vinyl chloride polymer, polyurethane resin or epoxy resin or arbitrary combinations thereof may be used. The binder is used within the range of 5-100 weight percent, preferably 10-40 weight percent with respect to 100 weight percent. As a dispersing agent, many kinds of surface active agents may be used within the range of 0.3-10 weight percent, preferably 0.5-3 weight percent with respect to 100 weight percent of the magnetic particles. As a solvent, methylbenzene, methyl ethyl ketone, methyl isobutyl ketone or cyclohexane or arbitrary combinations thereof may be used within the range of 100-800 weight percent, and preferably 150-400 weight percent. A hardening agent and/or an adding agent is added to the magnetic paint thus produced, if necessary, so that a final adjustment is carried out. Thereafter, the magnetic paint is coated on a base film of polyethylene terephthalate (PET) by means of an arbitrary coating machine such as a doctor blade coater or a reverse roll coater. Then, smoothing, orientation and dry processes are carried out. Thereafter, a surface smoothing process for the magnetic paint on the base film is performed by a calender. Finally, the film is slit into width of ½ inch so that a magnetic tape is formed.

A detailed example will be described below.
1. Magnetic particles: 100 weight percent
   Material: Co adsorbed γ-hematite (Co-γ-$Fe_2O_3$)
   Length: 0.16 (μm)
   Axial ratio: 1:9
   Coercive force: 870 (Oe)
   Co atoms: $Fe^{+2}$ atoms: 1.0:2.0
2. Dispersing agent: 1 weight percent
   DUOMEEN TDD (cationic surface active agent manufactured by Lion AKZO)
3. Binder
   3.1 VAGH: 10 weight percent (copolymer of vinyl chloride, vinyl acetate and vinyl alcohol manufactured by U.C.C.)
   3.2 N2304: 10 weight percent (polyurethane resin manufactured by Nippon Polyurethane)
   3.3 Colonate L: 3 weight percent (hardening agent of isocyanate compound manufactured by Nippon Polyurethane)
4. Solvent: methyl ethyl ketone, methylbenzene and cyclohexane: 300 weigh percent
5. Adding agent
   5.1 carbon black: 3 weight percent (electrification preventing agent)
   5.2 alumina: 2 weight percent (abrasive)

After pre-kneading the dispersing agent, a part of the above solvent and the magnetic particles, VAGH was added and the primary dispersion was carried out by means of the vibrating mill. Thereafter N2304 and a part of the solvent were added and the secondary dispersion was carried out by means of the vibrating mill. After terminating the secondary dispersion, Colonate L which was dissolved by the solvent was added and kneaded, so that a magnetic paint was obtained. The magnetic paint was coated on polyethylene terephthalate (PET) and magnetically oriented and dried. Then, the surface smoothing process by use of the calender was performed. The characteristics of the magnetic tape thus obtained are listed below.

| | |
|---|---|
| Residual magnetic flux density | 1,400 (Gauss) |
| Coercive force | 910 (Oe) |
| Rectangular ratio | 0.75 |
| Average surface roughness | 0.04 (μm) |
| Magnetic film thickness | 4.5 (μm) |

The recording and reproduction were carried out for the magnetic tape having the above characteristics. Parameters set in the recording and reproduction were as follows: A tape-head relative velocity of 5.8 m/sec, a head track width of 58 μm and a head gap length of 0.3 μm. Video characteristics and audio characteristics obtained in this experiment are shown in TABLEs IV and V. Relative values shown in TALBE IV are based on the magnetic tape #2.

TABLE IV

| Measurement frequency (MHz) | 4.5 | 6 | 8 |
|---|---|---|---|
| Carrier output (dB) | +6.6 | +8.7 | +11.5 |
| Carrier output-to-noise ratio (dB) | +8.5 | +9.9 | +10.8 |
| Optimum recording current (dB) | +1.4 | +1.2 | +1.1 |

TABLE V

| | Magnetic tape by experiment | Magnetic tape #2 |
|---|---|---|
| Peak bias level | +8% | 0% |
| Sensitivity | −6.7 dBs | −7.3 dBs |
| Freq. characteristic | +2.0 dB | −0.5 dB |
| S/N | 42 dB | 40.0 dB |
| Destortion ratio | 1.2% | 1.2 dB |
| MOL | −0.5 dBs | −1.2 dBs |
| Erased ratio | 68 dB | 70 dB |

Further, the recording and reproduction for the above magnetic tapes were carried out in the standard mode. It was confirmed that there is no problem regarding the video and audio characteristics. Moreover, the recording and reproduction were carried out for the above magnetic tapes in the high picture quality mode. This experiment revealed that there can be obtained a high picture quality having the horizontal resolution of 400 lines or over within the tolerable range of the edge noise. As a conclusion, the magnetic tape provided by the present invention can realize the interchangeability between the standard and high picture quality modes. In other words, it is possible to commonly use the magnetic tape of the present invention in both the modes.

It should be noted that the magnetic tape and its method of production are only examples for achieving the interchangeability between both the modes and the present invention is not limited to the above examples.

When considering the novelty and non-obviousness of the present invention, the following matters should be emphasized. In order to provide a magnetic recording medium which can be used in both of the standard and high picture quality modes, as described in the foregoing, the recording medium must have the characteristics shown in TABLE I when a ferrite head is used. According to the existing concept regarding this matter, the saturation magnetic flux density Bs required in the ferrite head is seven times or over that of the coercive force of the magnetic medium (if necessary, see "VTR Design Up-To-Date Technical Data collection", Nippon Industrial Technique Center, pp. 27). According to this document, since the saturation magnetic flux of ferrite is approximately 4,800 Gauss, it is impossible to use the ferrite head for the magnetic recording medium (magnetic tape) having the coercive force of 700 Oe or over. The present invention is contrary to this existing concept and has demonstrated that the magnetic tape having the coercive force of 700 Oe or over can be applied to the ferrite head by constituting the recording medium as claimed and discussed in the foregoing. There is also another existing concept that there is a close correlation between the coercive force of the magnetic recording medium and the optimum recording current (if necessary, see "Magnetic Recording Study Society Documents MR73-27", Institute of Communication Engineers, pp. 6). This document shows that the coercive force Hc of the magnetic recording medium having the optimum recording current which is 1.6 dB larger than that of the magnetic recording medium having the coercive force of 700 Oe is approximately 800 Oe. The present invention is also contrary to this concept and has revealed that the coercive force can be used up to 980 Oe by the configuration as claimed and described in the foregoing. Furthermore, it is known that there exists a phenomenon of a so-called super paramagnetism in particulates of ferromagnetic material. With this phenomenon, when the size of the particulates of ferromagnetic material becomes smaller than a certain value, the coercive force apparently becomes zero and therefore hard magnetism is lost. For $\gamma$-hematite, some manufacturers of hard magnetism particles have an opinion that super paramagnetism occurs when the length of $\gamma$-hematite is equal to or less than 0.2 $\mu$m. The present invention is contrary to this existing concept and has proven that the hard magnetism which is required in the magnetic material for the magnetic recording can be retained in even magnetic particles of length of 0.2 $\mu$m or less by selecting the ratio of Co atoms to $Fe^{2+}$ atoms as shown in the foregoing. The quantity of $Fe^{2+}$ ion can be controlled in the production process.

In order to demonstrate whether the recording medium of the present invention has satisfactory video and audio characteristics in the high picture quality mode, it is necessary to prepare a video tape recorder for valuation having a carrier frequency higher than that in the standard video tape recorder. However, currently such a video tape recorder for valuation cannot easily be assembled. A so-called 8 mm video tape recorder can provide a high picture quality which is not considerably different from that provided in the high picture quality mode of the video tape recorder from the point of view of the recording wavelength. In the 8 mm video tape recorder, a metal head and a metal tape are employed as a magnetic head and a magnetic tape, respectively. However, it is assumed that this selection of materials for the head and tape is derived from the existing concept that there is a limitation on the characteristics of the combination of the ferrite head and oxide tape. To the contrary, that the present invention has been created by breaking through the above existing concepts.

The present invention is not limited to the embodiments, but various variations and modifications are made without departing from the scope of the present invention.

What is claimed is:

1. A magnetic recording medium capable of recording and reproducing with a standard magnetic video signal recording and reproducing system at a standard carrier frequency and capable of recording and reproducing with another magnetic video signal recording and reproducing system at another carrier frequency that is substantially larger than said standard carrier frequency, said magnetic recording medium comprising:

a base film; and
a magnetic film having magnetic particles, dispersed in a binder and formed on said base film, said magnetic particles being $\gamma$-hematite with cobalt (Co) added or absorbed such that a ratio of Co atoms to $Fe^{2+}$ atoms is within the range of 1:1.5 to 1:2.5,
said magnetic film having a coercive force ranging from 750 Oe to 980 Oe and a residual magnetic flux density of 1,250 Gauss or over, and said magnetic particles having a length of 0.2 $\mu$m or below so that a carrier output of said magnetic recording medium is sufficiently large to be suitable for said another magnetic video signal recording and reproducing system and an optimum recording current of said magnetic recording medium is kept within a predetermined range suitable for said standard magnetic video signal recording and reproducing system.

2. A magnetic recording medium as defined in claim 1, wherein said magnetic recording medium is capable of recording a signal of a frequency band between 3.4 and 4.4 MHz by said standard magnetic video signal recording and reproducing system and is capable of recording a signal of a frequency band between 5 and 7 MHz by said another magnetic video signal recording and reproducing system.

3. A magnetic recording medium as claimed in claim 1, wherein an axial ratio of said $\gamma$-hematite with Co added or adsorbed is within the range of 1:6 to 1:20.

* * * * *